United States Patent [19]

Quantz

[11] Patent Number: 5,623,867
[45] Date of Patent: Apr. 29, 1997

[54] APPARATUS FOR CRACKING NUTS AT HIGH PRODUCTION RATES

[75] Inventor: James B. Quantz, Columbia, S.C.

[73] Assignee: John B. Sanfilippo & Sons, Inc., Elk Grove, Ill.

[21] Appl. No.: 575,278

[22] Filed: Dec. 20, 1995

[51] Int. Cl.$^6$ ..................................................... A23N 5/00
[52] U.S. Cl. .............................. 99/571; 99/574; 99/581
[58] Field of Search .................... 99/568, 571–576, 99/577–579, 580–583; 426/481, 482; 30/120.1–120.5; 198/622

[56] References Cited

U.S. PATENT DOCUMENTS

| | | | |
|---|---|---|---|
| 1,160,376 | 11/1915 | Gilson | 99/569 |
| 1,208,324 | 12/1916 | Canale | 99/572 |
| 1,342,691 | 6/1920 | Pape | 99/582 X |
| 1,470,247 | 10/1923 | Wilms | 99/572 |
| 1,901,798 | 3/1933 | Boomer | 99/586 X |
| 2,067,566 | 1/1937 | Field | 99/582 |
| 2,635,662 | 4/1953 | Doering et al. | 198/622 X |
| 2,903,134 | 9/1959 | Ashlock, Jr. | 99/569 X |
| 3,561,513 | 2/1971 | Lindsey | 99/571 |
| 3,621,898 | 11/1971 | Turner | 99/571 |
| 3,871,275 | 3/1975 | Quantz | 99/571 |
| 4,332,827 | 6/1982 | Quantz | |
| 4,418,617 | 12/1983 | Quantz | 99/581 X |
| 4,441,414 | 4/1984 | Quantz | 99/571 |

Primary Examiner—Timothy F. Simone
Attorney, Agent, or Firm—Bell, Seltzer, Park & Gibson, P.A.

[57] ABSTRACT

A high production nutcracking apparatus is provided wherein the nuts are fed from a hopper on a feed conveyor, and wherein the nuts are singularized and oriented while being advanced on the feed conveyor. The oriented nuts are thereafter advanced by the feed conveyor to a cracking apparatus, which comprises a plurality of cracking units mounted on a rotatable turret. The rotating cracking units are cyclically controlled so as to clampingly engage and lift each oriented nut from the advancing conveyor, and so as to preserve its orientation. The nut is then cracked and thereafter released at separate spaced points along the circular path of travel of the cracking unit. The nut feed conveyor comprises an upwardly inclined segment which passes through the hopper, and a horizontal segment which leads to the cracking apparatus.

16 Claims, 4 Drawing Sheets

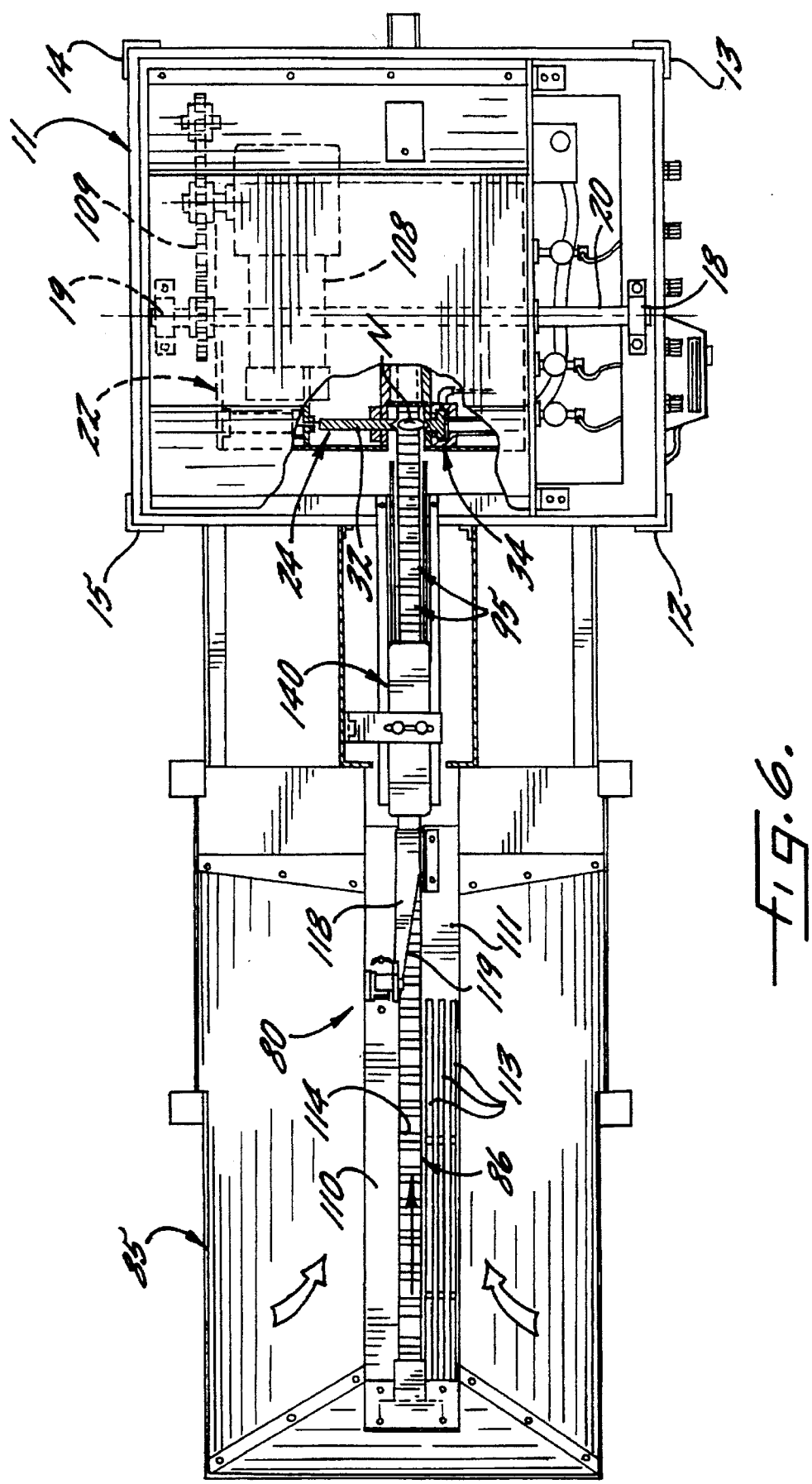

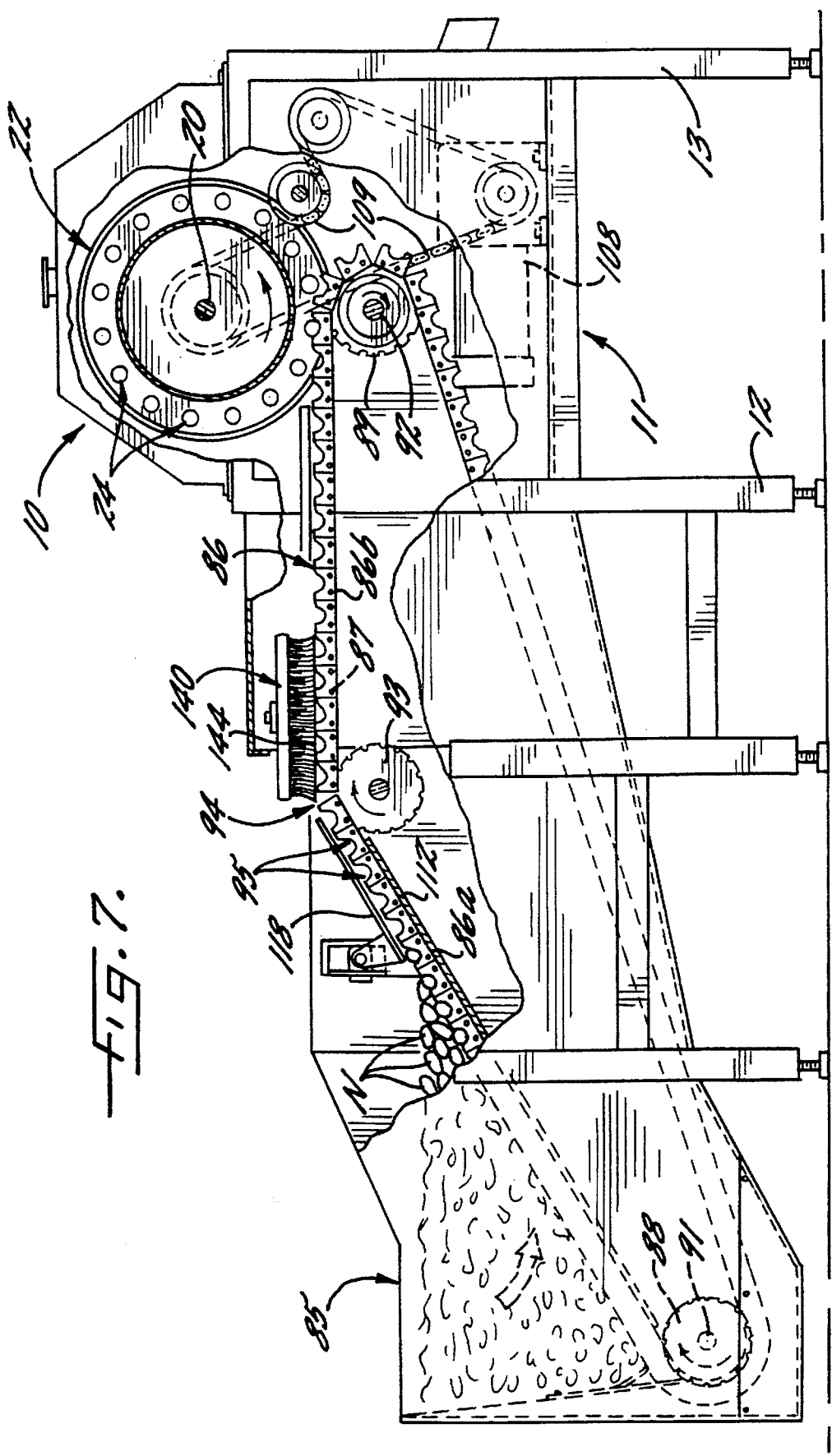

APPARATUS FOR CRACKING NUTS AT HIGH PRODUCTION RATES

FIELD OF THE INVENTION

The present invention relates to an improved apparatus for cracking nuts at high production rates.

In prior U.S. Pat. No. 4,418,617, there is disclosed a high production nutcracking apparatus wherein a plurality of cracking units are arranged on a rotatable turret, with each cracking unit having an opening adapted to receive an individual nut from a feed conveyor. Each cracking unit includes a mechanism for then cracking the nut as the turret continues to rotate, which is actuated by a pneumatic control system.

The feed conveyor as disclosed in the '617 patent includes a feed chain which comprises a plurality of nut transport elements which are mounted in succession, and with each nut transport element having an upwardly open receptacle for receiving an individual nut as it advances through a feed hopper. The feed chain extends in an upwardly inclined direction through the feed hopper and it is designed to feed the nuts from the hopper at a relatively high speed to the cracking units, while effectively orienting the nuts in the respective receptacles so that they may be engaged by the cracking units in an end to end orientation.

In order to permit individual nuts to be reliably received in the receptacles of the feed chain at high speeds, the length of the feed chain passing through the hopper should be as long as possible, and in addition, it is most effective to have the feed chain be upwardly inclined as it passes through the hopper. However, the upwardly inclined orientation acts to limit the length of the feed chain, and thus the speed of operation of the apparatus.

It is accordingly an object of the present invention to provide a high production nutcracking apparatus of the described type which effectively overcomes the above noted limitation in the speed of operation.

It is a more particular object of the present invention to provide a nut feeding apparatus for a high speed nutcracking apparatus which provides for an increased length of the feed chain in the nut hopper, so as to permit the feed chain to reliably pick up individual nuts from the hopper and then reliably singulate and orient the nuts into an end to end orientation before being delivered to the cracking units of the nutcracking apparatus.

SUMMARY OF THE INVENTION

These and other objects and advantages of the present invention are achieved in the embodiment illustrated herein by the provision of a nut feeding apparatus which comprises a hopper for storing a relatively large quantity of the nuts to be cracked, and an endless conveyor which has an upper run extending through the hopper to a delivery point exteriorly thereof. The conveyor includes a feed chain and a plurality of nut transport elements mounted in succession on the feed chain. Each element includes opposite sides and a generally semi-circular, laterally extending receptacle which faces upwardly during movement of the element through the hopper and to the delivery point. Each receptacle is sized to supportingly receive a single nut to be cracked and which is oriented with its end to end direction extending along the receptacle.

The upper run of the endless conveyor includes an upwardly inclined segment extending through the lower portion of the hopper and a substantially horizontal segment extending from the upwardly inclined segment to the delivery point, and the upwardly inclined segment and the horizontal segment define a transition juncture therebetween. By thus dividing the path of travel of the upper run into upwardly inclined and horizontal segments, the length of the conveyor in the hopper can be increased, which in turn permits an increased operating speed.

A power system is provided for rotating the endless conveyor such that the nut transport elements move in succession through the hopper and to the delivery point, and singularizing and orienting means is mounted along the upper run of the endless conveyor for effectively removing any nuts in excess of one from the receptacle of each nut transport element and for effectively orienting such nut with its end to end direction extending along the receptacle. This singularizing and orienting means includes means positioned above the transition juncture for precluding the significant lifting of the nuts from the receptacles as they pass across the transition juncture.

In the preferred embodiment, the means for precluding the lifting of the nuts comprises a brush which includes a support member and myriad bristles extending outwardly from one side of the support member, and with the brush being horizontally oriented and positioned so that the bristles extend downwardly from the support member and closely overlie the transition juncture as well as a portion of the horizontal segment of the upper run of the conveyor which is immediately downstream of the transition juncture. As will be explained in more detail below, the brush has also been found to assure that substantially all of the nuts are singulated and properly oriented in their respective receptacles of the conveyor.

The advancing oriented nuts are then clampingly engaged in succession at the delivery point of the endless conveyor by respective cracking units mounted on a rotating turret, and so as to preserve the orientation of the nuts. The nuts are thereby withdrawn from a first path of travel which is defined by the conveyor and are thereafter conveyed along a curvilinear second path of travel, i.e., the circular path resulting from the rotation of the turret. A cracking force is applied to each nut at a point along the second path of travel downstream of the point at which the nuts are withdrawn from the first path of travel, and the cracked nuts continue to be held in the cracking units, until a predetermined release point along the second path of travel is reached.

The singularizing and orienting means of the present invention may further comprise a deflecting plate positioned in the hopper above the advancing receptacles, and so as to laterally deflect the upper portion of each of any upstanding nuts disposed in each receptacle, and thereby laterally orient the nuts. Also, there may be provided an ejecting arm position in the hopper for laterally ejecting any laterally oriented nuts in excess of one from each receptacle.

BRIEF DESCRIPTION OF THE DRAWINGS

Some of the objects and advantages of the invention having been stated, others will appear as a the description proceeds, when taken in connection with the accompanying drawings, in which:

FIG. 6 is a top plan view, partly broken away, of the apparatus of the present invention; and FIG. 7 is a sectional side elevation view, partly broken away, of the apparatus.

DETAILED DESCRIPTION OF THE PREFERRED EMBODIMENT

Figure 1:
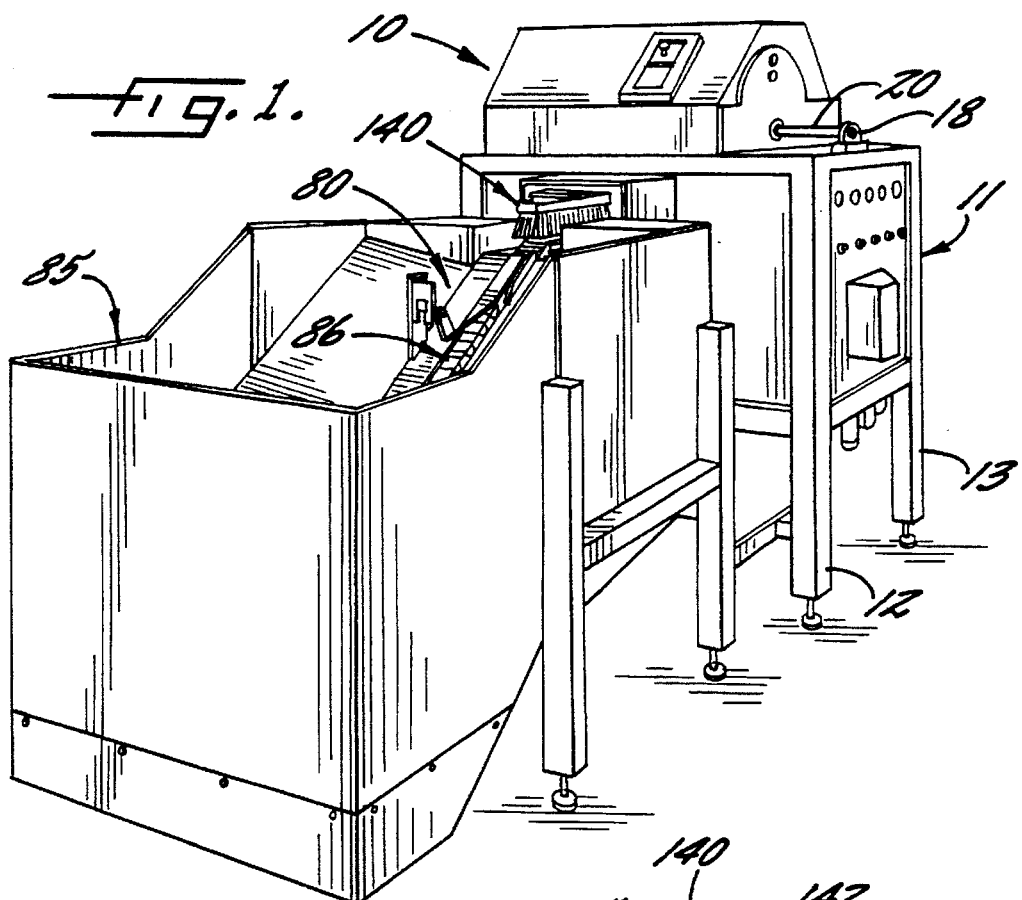
FIG. 1 is a perspective view of a nutcracking apparatus which embodies the features of the present invention.

Referring more specifically to the drawings, a nutcracking apparatus embodying the features of the present invention is illustrated generally at 10 in FIG. 1. The apparatus includes a rectangular box-like frame 11 comprising four vertical legs 12, 13, 14, 15, and a number of horizontal end and side braces interconnecting the legs. The upper horizontal end braces support a pair of bearing blocks 18, 19 (FIG. 6) which rotatably mounts a central shaft 20 which defines a horizontal central axis.

Figure 5:
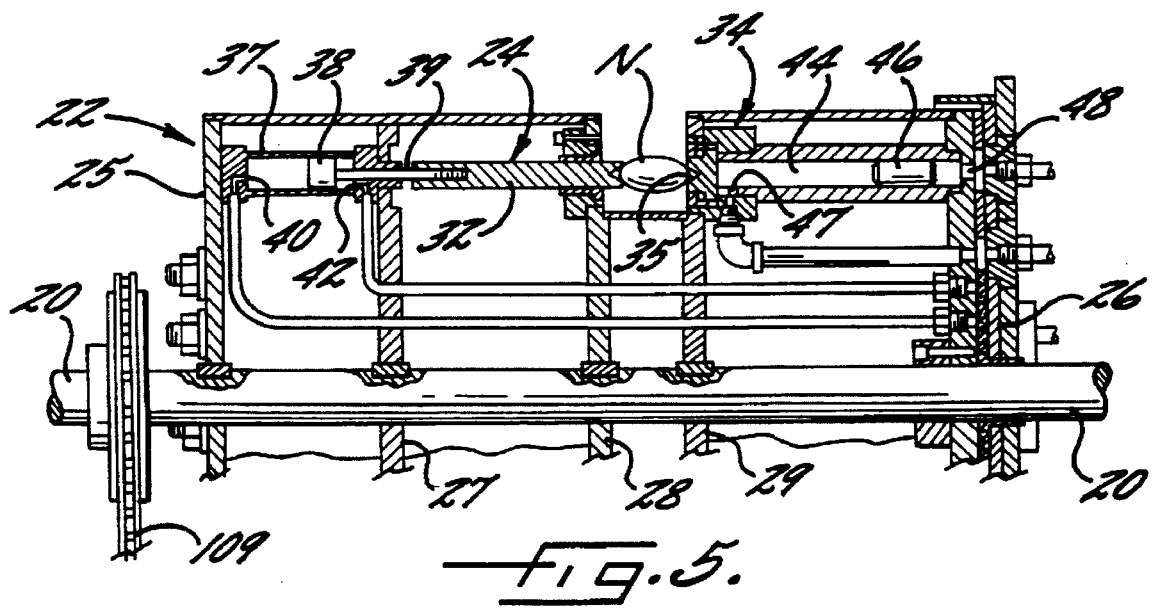
FIG. 5 is a fragmentary sectional view of the upper portion of the turret, and illustrating one of the cracking units.

As best seen FIGS. 5 and 6, a turret 22 is fixedly mounted to the shaft 20 so as to be rotatable with the shaft about the central axis. The turret 22 comprises a plurality of elongate cracking units 24 which are circularly arranged about the shaft and supported by the end plates 25 and 26, and the intermediate plates 27, 28 and 29. There are sixteen cracking units in the illustrated embodiment and the units extend generally parallel to each other and to the central axis.

Each of the cracking units 24 comprises an anvil 32, a cracking die assembly 34 which includes a cracking hammer 35. The anvil and cracking die assembly are mounted in an axially aligned, opposed relationship to define an opening for receiving a nut N therebetween. More particularly, the means for mounting the anvil 32 includes a first air cylinder 37, a piston 38 slidably disposed within the cylinder 37, a piston rod 39 interconnecting the piston and anvil, a first air port 40 disposed adjacent the rearward end of the cylinder, and a second air port 42 disposed adjacent the forward end of the cylinder. As will be apparent, movement of the piston 38 results in a corresponding movement of the anvil 32, either forwardly toward the cracking die assembly 34 or rearwardly therefrom. Such movement is controlled by air which is selectively provided to the first and second ports 40, 42 in a manner more fully disclosed in U.S. Pat. Nos. 4,418,617 and 4,441,414, the disclosures of which are expressly incorporated herein by reference.

The cracking die assembly 34 is more fully described in the above referenced '414 patent, and it includes the cracking hammer 35, and a second air cylinder 44. A free floating shuttle 46 is mounted within the cylinder 44. In addition, there is provided an air port 47 adjacent the forward end of the cylinder and a further port 48 which extends axially through the rearward end of the cylinder.

The control system for cyclically actuating the cracking unit includes an air control system whereby air is selectively introduced into the four ports 40, 42, 47, and 48. More particularly, upon receiving a nut N in the opening between the anvil 32 and cracking die assembly 34, air is first introduced into the port 40 so that the piston 38 and anvil 32 are moved forwardly and such that the anvil 32 operatively engages one end of the nut N in the opening. The nut thereby becomes supported between the anvil 32 and cracking hammer 35. The anvil 32 and cracking hammer 35 thereby also serve to compressively stress the retained nut. High pressure air is next injected through the port 48 and into the air cylinder 44, such that the shuttle 46 is thrust forwardly along the cylinder and impacts against the rear end surface of the cracking hammer 35, causing the cracking hammer to sharply advance a short distance forwardly against the nut and thereby crack its shell. The air in front of the advancing shuttle is permitted to exhaust through the port 47. Air next enters the port 42, causing the piston 38 and anvil 32 to move rearwardly and release the nut, and as a final step, air is caused to enter the port 47 and thereby return the shuttle 46 to its rearward position. The apparatus is then in position to receive another nut to be cracked, with the above cycle being cyclically repeated. Further details regarding the air control system for cyclically actuating the apparatus 10 may be obtained from the above noted prior patents.

The apparatus of the present invention further includes an apparatus 80 for advancing and delivering a plurality of nuts individually in succession along a path of travel to the rotating turret 22. This nut delivering apparatus includes a hopper 85 for storing a relatively large quantity of the nuts to be cracked, and an endless feed conveyor 86 which includes a feed chain 87 (FIG. 3) and a pair of supporting sprockets 88, 89 mounted respectively on the shafts 91, 92, which support the feed chain. Also, there is provided an intermediate supporting sprocket 93 as further described below.

The conveyor 86 is mounted for movement about the sprockets 88, 89, and includes an upper run which extends through the lower portion of the hopper 85 and along an upwardly inclined path of travel to a delivery point adjacent the bottom dead center position of the turret 22. More particularly, the upper run of the endless conveyor includes an upwardly inclined segment 86a extending through the lower portion of the hopper, and a substantially horizontal segment 86b extending from the upwardly inclined segment to a delivery point which is tangentially aligned along the bottom dead center position of the cracking units 24. The upwardly inclined segment 86a and the horizontal segment 86b define a transition juncture 94 therebetween and which is also defined by the supporting sprocket 93. More particularly, the transition juncture 94 is arcuately curved in accordance with the circumferential curvature of the supporting sprocket 93.

A plurality of block-like nut transport elements 95 are mounted in succession along the feed chain 87. As best seen in FIG. 4, each element 95 includes parallel opposite sides 96, 97, parallel opposite ends 98, 99, and top and bottom faces (not numbered). A generally semi-cylindrical receptacle 102 extends laterally across the upper face of the element, and so as to communicate with both sides 96, 97 thereof. By design, each receptacle 102 is sized to supportingly receive a single nut to be cracked which is oriented with its end to end direction extending axially along the receptacle. Each element 95 further includes a longitudinally channel 103 in the bottom face for receiving the feed chain 87, and a pair of transverse pins 104 (FIG. 3) for interconnecting the element to the chain. Further, the element 95 includes a slot 105 which extends longitudinally along the full length of the side 97, and which is disposed parallel to the bottom face of the element. The slot 105 extends laterally a portion of the distance across the element, and communicates with the receptacle 102. The portion 106 of the top face forwardly of receptacle will be seen to be inclined downwardly, so that the portion 107 rearwardly of the receptacle in effect protrudes upwardly so as to catch the nuts in the hopper and knock them into the receptacle.

The conveyor 86 is powered by the motor 108 and drive chain 109, which drives the sprocket 89 and which also drives the turret 22 in the manner seen in FIG. 7, and such that the transport elements and thus the nuts move from the hopper tangentially past the circle defined by the rotating cracking units 24, at a speed corresponding to such rotational speed.

Figure 2:
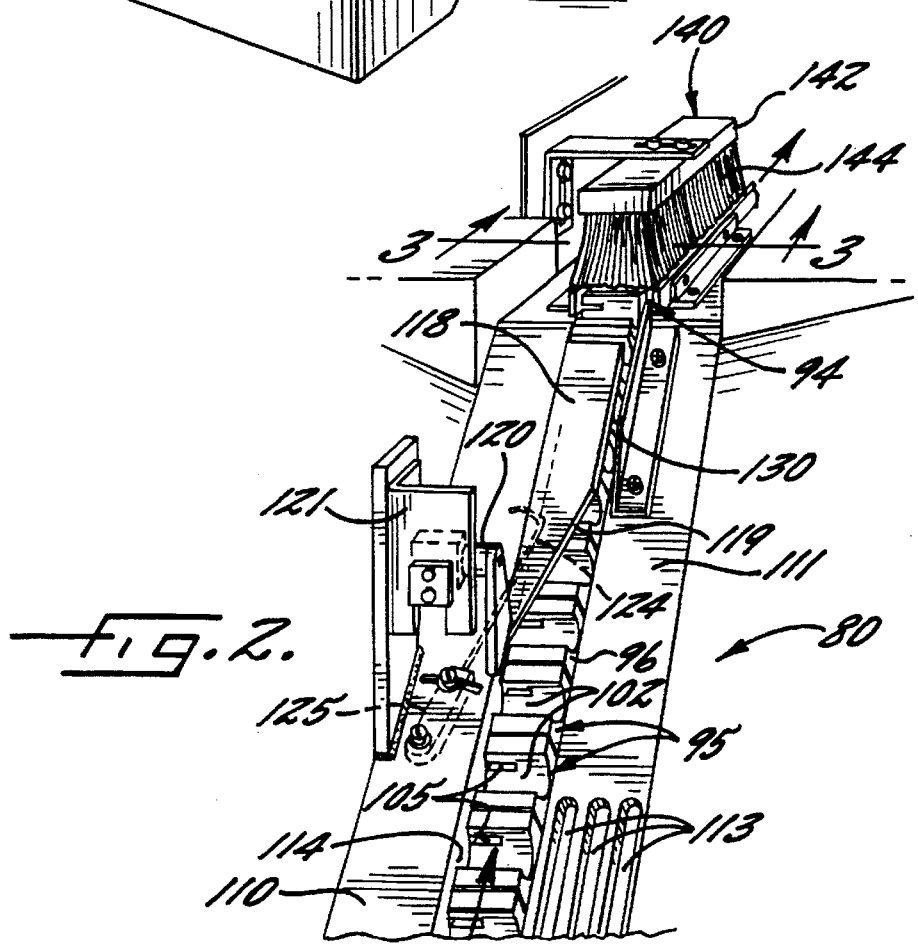
FIG. 2 is a fragmentary perspective view of the illustrated embodiment of the singularizing and orienting means of the present invention.
Figure 3:
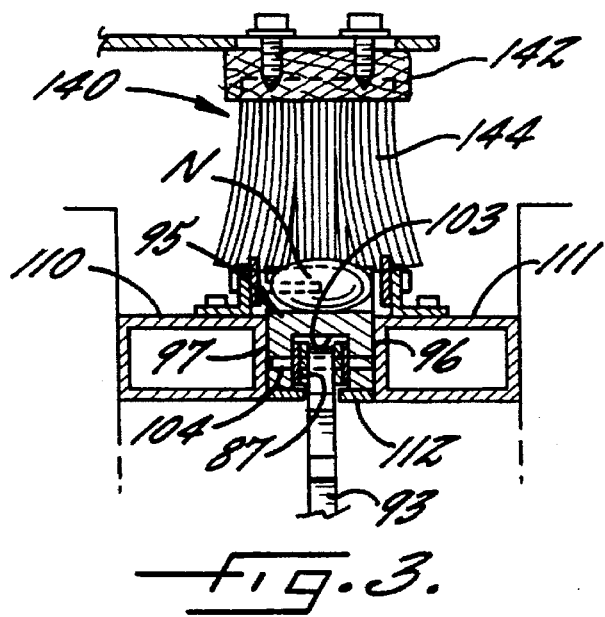
FIG. 3 is a fragmentary sectional front elevation view taken substantially along the line 3—3 of FIG. 2.
Figure 4:
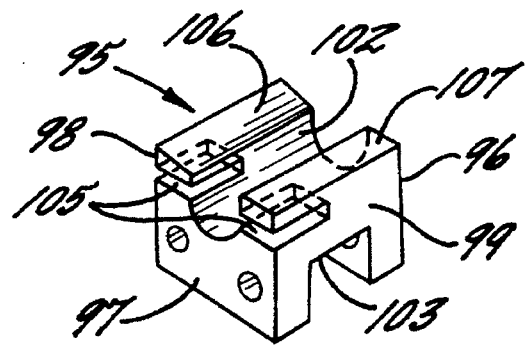
FIG. 4 is a perspective view of one of the nut transport elements of the feed conveyor.

The bottom of the hopper 85, and the bottom of the horizontal segment 86b of the upper run of the conveyor, are defined in part by a pair of rectangular support members 110, 111 and a bottom plate 112, note FIGS. 2 and 3. A rectangular channel is thereby defined between the members 110, 111, along which the elements move in succession. Within the hopper, the member 110 is disposed at an elevation somewhat above the member 111, and such that the side 114 of the member 110 serves to fully cover and close the adjacent end of the receptacles 102 moving therealong. The top of the member 111 is disposed at an elevation generally corresponding to the bottom of the receptacles 102. Also, the member 111 may include slots 113 for permitting the removal of shell fragments and other debris.

The hopper 85 includes singularizing and orienting means to ensure that any nuts in excess of one are removed from the receptacle 102 of each nut transport element 95, and that each nut is oriented with its end to end direction extending axially along the receptacle 102. This singularizing and orienting means includes a deflecting plate 118 which is designed for laterally deflecting the upper portion of each of any upstanding nuts disposed in each receptacle toward the side 96 of the element, as the element moves through the hopper, to thereby laterally orient the nuts. The plate 118 has a forward edge 119, and a length sufficient to overlie the path of several nut transport elements. In addition, the plate 118 is mounted in the hopper so as to overlie the path of the nut transport elements and such that the forward edge 119 extends diagonally across such path. The plate 118 is pivotally connected adjacent its upstream end for pivotal movement about a horizontal axis defined by the anchoring pin 120, and such that the plate may be lifted upwardly from the elements 95 in the event a foreign object, such as a rock, enters the hopper and moves between the elements 95 and the plate 118. The pin 120 is in turn mounted to the bracket 121 so as to permit its elevation to be adjusted, and thus permit the elevation of the upstream end of the plate 118 to be adjusted.

The singularizing and orienting means of the apparatus further includes means for laterally ejecting any laterally oriented nuts in excess of one for each receptacle. This ejecting means comprises an arm 124, which is mounted in the hopper so that the arm extends a predetermined lateral distance into the slot 105 of each advancing element, to thereby deflect each nut therein which is adjacent the side 97 and so that it moves toward the side 96. The arm 124 is adjustably mounted by means of the mounting plate 125, and is typically positioned to extend into the slot 105 so that the distance between the innermost portion of the arm and the side 96 corresponds to the average length of the nut being processed. Thus in the event two relatively small nuts are positioned in any receptacle in end to end alignment, the arm will serve to eject the one closest to the side 96. It will also be noted from FIG. 2 that the elongate deflecting plate 118 overlies the operative portion of the ejecting arm 124, and thus serves to prevent nuts from lifting upwardly from the associated receptacle 102 upon being contacted by the arm 124.

The hopper 85 also mounts an upwardly inclined guide surface 130 which is positioned on the support member 111 along the side 96 of the elements 95, and downstream of the deflecting edge 119 of the plate 118 and the ejecting arm 124. The guide surface 130 is positioned so as to contact that portion of any nut extending laterally from its supporting receptacle 102 on the side 96, and acts to move the nut back into the receptacle.

In accordance with the present invention, the singularizing and orienting means further comprises a brush 140 positioned above the transition juncture for precluding the lifting of the nuts from the receptacles 102 as they pass across the transition juncture 94 at high speed. The brush includes a support member 142 and myriad relatively flexible bristles 144 extending outwardly from one side of the support member 142, and is of a construction similar to that of a common heavy duty broom. The brush 140 is horizontally oriented and positioned so that the bristles extend downwardly from the support member and closely overlie the transition juncture 94 as well as a portion of the horizontal segment 86b of the upper run of the conveyor 86 which is immediately downstream of the transition juncture.

As will be apparent, when the apparatus is operating at high speed, the nuts will tend to lift completely out of the receptacles when passing over the transition juncture 94, by reason of their upward inertia. The brush 140 serves to limit such upward lifting, yet the flexibility of the bristles permits a slight lifting and then a resettling of the nuts back into the receptacles. Also, the contact between the nuts and the bristles tends to spin the nuts as they continue to advance along the horizontal segment 86b. These movements of the nuts have been found to reliably orient those few nuts which are not properly aligned by the plate 118 and arm 124, and reliable orientation is thereby achieved at very high production speeds.

To describe the operation of the apparatus in more detail, it will be understood that the motor 108 acts to rotate the turret 22 about the central axis of the shaft 20, and to advance the conveyor 86 so that the upper run moves toward the turret at a speed corresponding to the rotational speed of the cracking units 24. The nut transport elements 95 thereby move in succession through the hopper 85, and the nuts therein are received in the receptacles 102, and singularized and oriented by contact with the plate 118, arm 124, guide surface 130, and brush 140 in the manner described above. The nuts are thereby effectively individually received in the respective receptacles 102, and oriented with their end to end direction being disposed horizontally and perpendicular to the direction of movement of the upper run of the conveyor.

By design, the nuts are moved in succession to the openings between the anvil 32 and cracking die assembly 34 of a cracking unit 24 as the cracking unit passes a nut loading or pickup position which is located at about the bottom dead center of the circle defined by the rotating cracking units. At this point, pressurized air is directed to the first port 40 of the cracking unit. The piston 38 and anvil 32 are thereby moved forwardly, and such that the anvil operatively engages one end of the nut N in the opening, and with the force acting through the nut to clampingly engage and retain the nut in an end to end alignment between the anvil and the cracking hammer 35 of the die assembly 34. The nut is thereby lifted from its receptacle on the feed conveyor 86. The frictional contact between the piston 38 and the walls of the air cylinder 37 serve to maintain the forward axial position of the anvil during rotational movement of the cracking unit upwardly and away from the conveyor.

The nut is then advanced along a curvilinear path of travel, i.e., the circle defined by the rotating cracking units 24, and to a nut stressing location, which is located about 60 degrees beyond the bottom dead center. At this location, air again enters the first port 40 to compressively stress the retained nut. Immediately thereafter, high pressure air is injected into the port 48 of the air cylinder 44, such that the shuttle 46 is thrust forwardly along the cylinder 44 and impacts against the rear side of the cracking hammer 35, causing the cracking hammer to sharply advance a short distance forwardly and thereby crack the nut. The air in front of the advancing shuttle exhausts through the port 47, which is of relatively large diameter to accommodate the entering air without an undue build-up of pressure. Most of the loose shell fragments resulting from the cracking operation are drawn off through a housing by a vacuum line (not shown). Further, the cracking operation preferably occurs while the nut remains under compressive stress.

The cracked nut remains supported between the anvil and cracking hammer after the cracking operation, and is carried to a release point, which is preferably positioned at about 45° beyond the top dead center position of the turret. At this point, air enters the second port 42, and the piston and anvil are moved rearwardly. The released nut then falls to the laterally directed discharged chute (not shown).

As the final step, air is caused to enter the port 47, and the shuttle 46 to return to its rearward position. The cycle may then be repeated as the cracking units move through the loading position to receive another nut from an aligned receptacle.

In the drawings and specification, there has been set forth a preferred embodiment of the invention, and although specific terms are employed, they are used in a generic and descriptive sense only and not for purposes of limitation.

That which is claimed is:

1. An apparatus for successively delivering nuts in a predetermined orientation to a cracking head of a nutcracker or the like, and comprising a hopper for storing a relatively large quantity of the nuts to be cracked, endless conveyor means having an upper run extending through said hopper to a delivery point exteriorly thereof, with said conveyor means comprising a feed chain and a plurality of nut transport elements mounted in succession on said feed chain, with each element including opposite sides and a generally semicircular, laterally extending receptacle which faces upwardly during movement of the element through said hopper and to said delivery point, and with each receptacle being sized to supportingly receive a single nut to be cracked which is oriented with its end to end direction extending along the receptacle, said upper run of said endless conveyor means including an upwardly inclined segment extending through the lower portion of said hopper and a substantially horizontal segment extending from said upwardly inclined segment to said delivery point, and with the upwardly inclined segment and the horizontal segment defining a transition juncture therebetween, power means for rotating said endless conveyor means such that said nut transport elements move in succession through said hopper and to said delivery point, and singularizing and orienting means mounted along said upper run of said endless conveyor means for effectively removing any nuts in excess of one from the receptacle of each nut transport element and for effectively orienting such nut with its end to end direction extending along the receptacle.

2. The apparatus as defined in claim 1 wherein said singularizing and orienting means includes means positioned above said transition juncture for precluding significant lifting of the nuts from the receptacles as they pass across the transition juncture.

3. The apparatus as defined in claim 2 wherein said means for precluding significant lifting of the nuts comprises a brush which includes a support member and myriad relatively flexible bristles extending outwardly from one side of the support member, and with the brush being horizontally oriented and positioned so that said bristles extend downwardly from the support member and closely overlie said transition juncture as well as a portion of the horizontal segment of the upper run of the conveyor means which is immediately downstream of said transition juncture.

4. The apparatus as defined in claim 3 wherein said endless conveyor means further comprises a supporting sprocket mounted below said transition juncture and so that said transition juncture is arcuately curved in accordance with the circumferential curvature of said supporting sprocket.

5. The apparatus as defined in claim 4 wherein the receptacle of each nut transport element communicates with at least one side of the associated element, and wherein said singularizing and orienting means further comprises means for laterally deflecting the upper portion of each of any upstanding nuts disposed in each receptacle toward said one side of the associated element as the element moves through said hopper to thereby laterally orient the nuts, and means for laterally ejecting any laterally oriented nuts in excess of one from each receptacle.

6. The apparatus as defined in claim 5 wherein said deflecting means comprises a plate having a forward edge, and means mounting said plate in said hopper so as to overlie the path of said nut transport elements and such that said forward edge extends diagonally across such path.

7. The apparatus as defined in claim 6 wherein said means mounting said plate in said hopper includes a horizontal pivotal connection adjacent the upstream end thereof and such that the plate may be lifted upwardly from the elements.

8. The apparatus as defined in claim 7 wherein each nut transport element includes a longitudinal slot communicating with the full length of the side of the element opposite said one side, as well as with the associated receptacle, and with said slot extending laterally a substantial portion of the distance across the element, and wherein said ejecting means comprises an arm, and means mounting said arm in said hopper so that the arm extends a predetermined lateral distance into the slot of each advancing element and thereby deflects each nut therein which is adjacent said opposite side toward said one side.

9. The apparatus as defined in claim 8 wherein said means mounting said arm is adjustable so as to permit the lateral extent of its entry into the slots to be selectively controlled.

10. The apparatus as defined in claim 8 wherein said plate has a longitudinal length sufficient to overlie at least a plurality of said elements and the operative portion of said ejecting arm, and such that the plate prevents nuts from lifting upwardly from the associated receptacle upon being contacted by said arm.

11. The apparatus as defined in claim 10 further comprising guide surface means mounted in said hopper downstream of said arm of said ejecting means and adjacent said one side of said elements for contacting that portion of any nut extending laterally from its supporting receptacle axially back into the receptacle.

12. The apparatus as defined in claim 10 wherein each of said receptacles extends fully across its associated nut transport element and communicates with both of its opposite sides, and wherein said singularizing and orienting means further comprises a side wall extending along the upper run of said conveyor means in said hopper so as to effectively cover the side of the receptacle opposite said one side as the receptacle moves through said hopper.

13. A high production nutcracking apparatus comprising, means for advancing a plurality of nuts individually in succession along a first path of travel with at least substantially all of the advancing nuts being disposed in a predetermined orientation, means for removing the advancing nuts in succession from the first path of travel and advancing the removed nuts in succession along a generally curvilinear second path of travel, and including means for clampingly engaging each nut during its removal from the first path of travel and advance along the second path of travel so as to preserve the predetermined orientation of each nut, and means for imparting a cracking force to each nut while being advanced along the second path of travel, and with the cracking force being applied in a direction corresponding to the clamping engagement of the nut, said means for advancing nuts along the first path of travel comprising (a) a hopper for storing a relatively large quantity of the nuts to be cracked, (b) endless conveyor means having an upper run extending through said hopper to a delivery point exteriorly thereof, with said conveyor means comprising a feed chain and a plurality of nut transport elements mounted in succession on said feed chain, with each element including opposite sides and a generally semicircular, laterally extending receptacle which faces upwardly during movement of the element through said hopper and to said delivery point, and with each receptacle being sized to supportingly receive a single nut to be cracked which is oriented with its end to end direction extending along the receptacle, (c) said upper run of said endless conveyor means including an upwardly inclined segment extending through the lower portion of said hopper and a substantially horizontal segment extending from said upwardly inclined segment to said delivery point, and with the upwardly inclined segment and the horizontal segment defining a transition juncture therebetween, (d) power means for rotating said endless conveyor means such that said nut transport elements move in succession through said hopper and to said delivery point, and (e) singularizing and orienting means mounted along said upper run of said endless conveyor means for effectively removing any nuts in excess of one from the receptacle of each nut transport element and for effectively orienting such nut with its end to end direction extending along the receptacle, said singularizing and orienting means including means positioned above said transition juncture for precluding significant lifting of the nuts from the receptacles as they pass across the transition juncture.

14. The apparatus as defined in claim 13 wherein said means for precluding significant lifting of the nuts comprises a brush which includes a support member and myriad relatively flexible bristles extending outwardly from one side of the support member, and with the brush being horizontally oriented and positioned so that said bristles extend downwardly from the support member and closely overlie said transition juncture as well as a portion of the horizontal segment of the upper run of the conveyor means which is immediately downstream of said transition juncture.

15. The apparatus as defined in claim 14 wherein said endless conveyor means further comprises a supporting sprocket mounted below said transition juncture and so that said transition juncture is arcuately curved in accordance with the circumferential curvature of said supporting sprocket.

16. The apparatus as defined in claim 15 wherein the receptacle of each nut transport element communicates with at least one side of the associated element, and wherein said singularizing and orienting means further comprises means for laterally deflecting the upper portion of each of any upstanding nuts disposed in each receptacle toward said one side of the associated element as the element moves through said hopper to thereby laterally orient the nuts, and means for laterally ejecting any laterally oriented nuts in excess of one from each receptacle.

* * * * *